US009793703B2

(12) United States Patent
Urresty

(10) Patent No.: US 9,793,703 B2
(45) Date of Patent: Oct. 17, 2017

(54) PROTECTING A PERMANENT MAGNET GENERATOR

(71) Applicant: ALSTOM Renewable Technologies Wind B.V., Breda (NL)

(72) Inventor: Julio Cesar Urresty, Barcelona (ES)

(73) Assignee: ALSTOM Renewable Technologies Wind B.V., Breda (NL)

(*) Notice: Subject to any disclaimer, the term of this patent is extended or adjusted under 35 U.S.C. 154(b) by 0 days.

(21) Appl. No.: 15/075,251

(22) Filed: Mar. 21, 2016

(65) Prior Publication Data

US 2016/0285251 A1   Sep. 29, 2016

(30) Foreign Application Priority Data

Mar. 25, 2015  (EP) .................................... 15382144

(51) Int. Cl.
*H02H 7/06* (2006.01)
*H02P 29/024* (2016.01)
(Continued)

(52) U.S. Cl.
CPC .............. *H02H 7/06* (2013.01); *H02K 11/27* (2016.01); *H02K 11/33* (2016.01); *H02P 9/006* (2013.01); *H02P 9/10* (2013.01); *H02P 29/027* (2013.01)

(58) Field of Classification Search
CPC .......... H02H 7/06; H02K 11/27; H02K 11/33; H02P 9/006; H02P 9/10; H02P 29/027
(Continued)

(56) References Cited

U.S. PATENT DOCUMENTS 3,984,750 A * 10/1976 Pfeffer ................. H02J 7/1484
                                                    322/32
4,164,705 A *  8/1979 Whitney .............. G01R 31/343
                                                    310/68 D
(Continued)

FOREIGN PATENT DOCUMENTS

EP         2 372 860 A1    10/2011
WO   WO 2014/079453 A2     5/2014

OTHER PUBLICATIONS

EP Search Report, Sep. 4, 2015.
(Continued)

*Primary Examiner* — Rita Leykin
(74) *Attorney, Agent, or Firm* — Dority & Manning, P.A.

(57) ABSTRACT

A method for protecting a permanent magnet generator of a wind turbine with a multiphase generator, and n number of isolated converters, the multiphase generator including a rotor carrying permanent magnets and n number of independent multiphase sub-stators comprising a plurality of windings, each converter being connected to an independent multiphase sub-stator and configured to control the plurality of windings of the multiphase sub-stator comprises determining an asymmetrical short circuit current in one of the sub-stators, which generates a first oscillating torque, disconnecting the converter linked to the sub-stator with an asymmetrically short circuited group of windings, and injecting an asymmetrical current with the remaining connected converters, wherein said injected asymmetrical current generates a second oscillating torque that is substantially opposed in phase to the first oscillating torque so that the first oscillating torque is at least partly compensated is disclosed. Permanent magnet generators are also disclosed.

14 Claims, 5 Drawing Sheets

(51) Int. Cl.
  *H02P 9/00*  (2006.01)
  *H02P 9/10*  (2006.01)
  *H02K 11/27* (2016.01)
  *H02K 11/33* (2016.01)

(58) Field of Classification Search
  USPC .......... 318/400.23, 400.24, 400.25, 400.22,
           318/400.26; 700/292; 702/58, 23;
           361/20; 322/52, 58, 63, 59, 68
  See application file for complete search history.

(56) References Cited

U.S. PATENT DOCUMENTS

| | | | | |
|---|---|---|---|---|
| 5,289,107 | A * | 2/1994 | Radun | H02P 9/40 318/696 |
| 5,404,091 | A * | 4/1995 | Radun | H02P 9/40 318/696 |
| 6,058,031 | A * | 5/2000 | Lyons | H02M 7/487 363/132 |
| 6,101,109 | A * | 8/2000 | Duba | H02M 7/49 363/41 |
| 6,583,598 | B2 * | 6/2003 | Raith | H02P 29/50 318/448 |
| 7,098,629 | B2 * | 8/2006 | Lijima | H02J 7/1492 322/25 |
| 7,253,634 | B1 * | 8/2007 | Kasztenny | H02H 1/0092 324/509 |
| 7,265,505 | B2 * | 9/2007 | Nakai | H02P 5/747 318/400.09 |
| 7,274,547 | B2 * | 9/2007 | Al-Khayat | H02P 9/02 307/98 |
| 7,276,871 | B2 * | 10/2007 | Ganev | H02P 9/006 318/434 |
| 7,439,697 | B2 * | 10/2008 | Miyazaki | B60L 11/123 310/112 |
| 7,528,611 | B2 * | 5/2009 | Kasztenny | H02H 1/0092 324/509 |
| 7,663,849 | B2 * | 2/2010 | Shah | H02H 7/06 361/20 |
| 8,054,026 | B2 * | 11/2011 | Shimana | B60L 3/003 318/490 |
| 8,310,242 | B2 * | 11/2012 | Itten | G01R 27/18 324/509 |
| 8,395,346 | B2 * | 3/2013 | Trainer | H02P 9/00 318/700 |
| 8,648,562 | B2 * | 2/2014 | Lipo | H02P 21/0089 318/400.01 |
| 8,653,797 | B2 * | 2/2014 | Cullen | H02K 3/28 318/700 |
| 8,928,269 | B2 * | 1/2015 | Pawelski | H02H 7/06 318/34 |
| 9,024,563 | B2 * | 5/2015 | Bunte | F03D 7/0224 318/494 |
| 9,541,064 | B2 * | 1/2017 | Rasmussen | F03D 7/028 |
| 2007/0086226 | A1 * | 4/2007 | Mavier | H02M 7/53875 363/132 |
| 2011/0050150 | A1 * | 3/2011 | Lilliestrale | H02P 23/08 318/716 |
| 2013/0070489 | A1 * | 3/2013 | Zhang | H02M 5/45 363/36 |
| 2014/0145541 | A1 * | 5/2014 | Jalebi | H02K 17/36 310/198 |
| 2014/0306583 | A1 | 10/2014 | Möller | |
| 2015/0303677 | A1 * | 10/2015 | Salam | H02H 7/06 361/21 |
| 2016/0204601 | A1 * | 7/2016 | Donescu | F03D 7/0272 361/21 |

OTHER PUBLICATIONS

Brian A. Welchko, et al., "IPM Synchronous Machine Drive Response to Symmetrical and Asymmetrical Short Circuit Faults", IEEE Transactions on Conversion, (Jun. 2, 2003), vol. 18, No. 2, doi:10.1109/TEC.2003.811746, pp. 291-298, XP002744042 [A] 1-14, pp. 293-294.

"Methods and Systems For Reducing the Impact of a Generator Short Circuit in a Wind Turbine", IP.Com Journal, IP.Com Inc., West Henrietta, NY, US, (Sep. 4, 2013), ISSN 1533-0001, XP013158858 [A] 1-14, pp. 9-10, line 1-11.

* cited by examiner

PROTECTING A PERMANENT MAGNET GENERATOR

The present disclosure relates to methods for protecting an electrical machine, and in particular the generator of a permanent magnet generator. The present disclosure further relates to permanent magnet generators and also to wind turbines incorporating such permanent magnet generators.

BACKGROUND

Electrical machines, such as motors and generators having a rotor with permanent magnets are known. They are generally deemed to be reliable and require less maintenance than other generator typologies.

Modern wind turbines are commonly used to supply electricity into the electrical grid. Wind turbines of this kind generally comprise a rotor with a plurality of blades. The rotor with the blades is set into rotation under the influence of the wind on the blades. The rotation of the rotor shaft drives the generator rotor either directly ("directly driven") or through the use of a gearbox. Particularly for offshore wind turbines, direct drive systems employing permanent magnets are usually chosen. However, this type of generator is not limited to offshore applications, and not even to the field of wind turbines only.

Use of a permanent magnet synchronous generator in the power train of a wind turbine has some advantages compared to other types of generators commonly used on wind turbines. These advantages include, inter alia, high efficiency, reduced losses on the rotor of the generator, lack of any slip-rings and their attendant problems, and better low voltage ride through performance.

However, when a short circuit event, such as an arc, occurs in the generator or converter during normal operation, a permanent magnet synchronous generator will continue to generate stator voltage as long as the generator is turning since the permanent magnets in the rotor will continue to produce a magnetic field. Therefore, short circuit currents arise under such conditions and they must be properly handled to avoid damage to the generator (and the wind turbine).

Different types of short circuit events can occur. Short circuit events can be dangerous. For example, such events can lead to fires.

Short circuit events may be handled in different ways in order to reduce impact on the wind turbine. In a three-phase generator and power converter configuration, a power converter failure will in most cases appear as a three-phase short circuit on the generator. Said three-phase short circuit on the generator will cause a transient torque oscillation followed by an almost complete unloading of the drive train. The unloading produces undesirable mechanical load levels on a wind turbine. One way to reduce the impact from such a short circuit event is to disconnect the converter from the generator and subsequently apply a passive dump load, which will serve to reintroduce a certain load torque (i.e. a resistant torque) on the drive train.

Another type of short circuit event is an unbalanced short circuit. When, for example, a two-phase short circuit (which is a type of unbalanced short circuit) occurs in the generator, a transient torque oscillation appears followed by a stationary torque oscillation with a frequency determined by the speed of the generator. One countermeasure that can be taken in response to an unbalanced short circuit in the generator is to shut down the wind turbine and bring it to a standstill.

However, as the rotor slows down and is brought to a standstill, the torque oscillation that depends on the speed of rotation would go through a very large frequency range resulting in a high risk of exciting resonances in the drive train and as the case may be the turbine foundation.

Various wind turbines are known that incorporate some form of countermeasures to overcome problems related to an unbalanced short-circuit. One known possible countermeasure consists of installing specific switching devices between phases of the generator in order to force a three phase fault when a two phase fault is detected reducing the short-circuit torque.

WO 2014/079453A2 discloses a method for reducing an impact of an unbalanced short circuit event that occurs in a polyphase permanent magnet generator of a wind turbine. According to the method, an unbalanced short circuit event is detected in the generator of the wind turbine, and, in response to detecting the unbalanced short circuit event, at least one phase of the generator is shorted at a switch-point between the generator and a converter of the wind turbine to create a balanced short circuit in the generator. By doing so, the torque response of the generator is altered to avoid high amplitude torque oscillations that would other occur as a result of the unbalanced short circuit event.

Another known possible strategy to avoid short-circuit related issues consists of installing protecting relays or switches to the star common points of the three-phase system in order to open the neutral point of the faulty system whenever a short-circuit is detected.

However, none of the above mentioned systems is able to provide high reliability on the detection of the fault. It might occur that a detection failure is produced and then the system switches over to the fault mode during normal operation. Furthermore, only the system forcing a three phase short-circuit is able to reduce the fault torque. However, since it is based on switching devices, a delay in the reaction time takes place.

In examples of the present disclosure, some of the aforementioned problems may be at least partially resolved.

SUMMARY

According to a first aspect, a method for protecting a permanent magnet generator of a wind turbine is provided. The generator of a wind turbine includes a multiphase generator, and n number of electrically isolated converters. The multiphase generator may include a rotor carrying permanent magnets and n number of independent multiphase sub-stators comprising a plurality of windings, each converter being connected to an independent multiphase sub-stator and configured to control the plurality of windings of the multiphase sub-stator. In accordance with this aspect, the method comprises determining an asymmetrical short circuit current in one of the sub-stators, which generates a first oscillating torque, disconnecting the converter linked to the sub-stator with an asymmetrically short circuited group of windings, and injecting an asymmetrical current with the remaining connected converters, wherein said injected asymmetrical current generates a second oscillating torque that is substantially opposed in phase to the first oscillating torque so that the first oscillating torque is at least partly compensated.

In examples according to this first aspect, instead of addressing the problem by installing additional electrical elements to the system, the consequences of the problem are reduced by means of the control regulation. As a consequence, the system response of injecting a negative sequence current by the converter may occur promptly. Thus, the proposed solution is considerably fast and effective, since it quickly reduces the undesired risk of turbine resonance to a great extent.

The injection of said asymmetrical current can occur by a negative sequence additional control in the converter, and has as a consequence the torque compensation meaning that the amplitude of the first oscillating torque is significantly reduced in a rather abrupt manner. Consequently, the risk of such oscillations exciting resonances in the wind turbine may be significantly reduced as well, which is the aim of the present disclosure.

In another aspect, a permanent magnet multiphase generator is provided. The multiphase generator may be electrically connected to at least two electrically isolated converters. The multiphase generator may include a rotor carrying permanent magnets and n number of independent multiphase sub-stators comprising a plurality of windings, each converter connected to an independent multiphase sub-stator and configured to control the plurality of windings of the multiphase sub-stator and a control configured to balance a first oscillating torque generated by an asymmetrical short circuit current with a method according to the first aspect of the disclosure and a plurality of sensors for measuring parameters indicative of currents in one or more of the stator windings.

In examples according to this aspect, the plurality of sensors may be arranged at or near an end of each of the stator windings located between the stator winding and the converter. These sensors may measure currents directly or indirectly.

In this aspect, faults can be detected in a reliable way, due to the location of the sensors at or near an end of the winding to measure the current. In examples according to this aspect, the generator may be coupled to three converters connected with three sets of 3-phase stator windings. Each set may be 40° electrically phase shifted in relation to each other and each stator winding within a single set may be 120° electrically phase shifted in relation to the remaining two stator windings, thus resulting in a 9-phase system.

Additional objects, advantages and features of embodiments of the invention will become apparent to those skilled in the art upon examination of the description, or may be learned by practice of the invention.

BRIEF DESCRIPTION OF THE DRAWINGS

Non-limiting examples of the present disclosure will be described in the following, with reference to the appended drawings, in which.

DETAILED DESCRIPTION OF EXAMPLES

A permanent magnet generator is a generator that has a plurality of stator windings and one or more permanent magnets whose magnetic field excites current flow in the stator windings during operation.

A typical AC synchronous generator includes a field system mounted on the rotor surrounded by stator windings mounted on the stator. The stator may be formed by one or more separate windings.

Each winding can include one or more coils that are located in coil slots formed in a surface of the stator assembly. The rotor provides a rotating magnetic field generated by conventional windings with slip rings or brushless excitation power supply. The turbine drives the rotor to rotate and AC power is provided by the stator winding. When the magnetic field that excites current flow in the stator windings is provided by a permanent magnet—as opposed to a coil or winding in the rotor—, the machine is known as a permanent magnet synchronous generator.

Figure 1A:
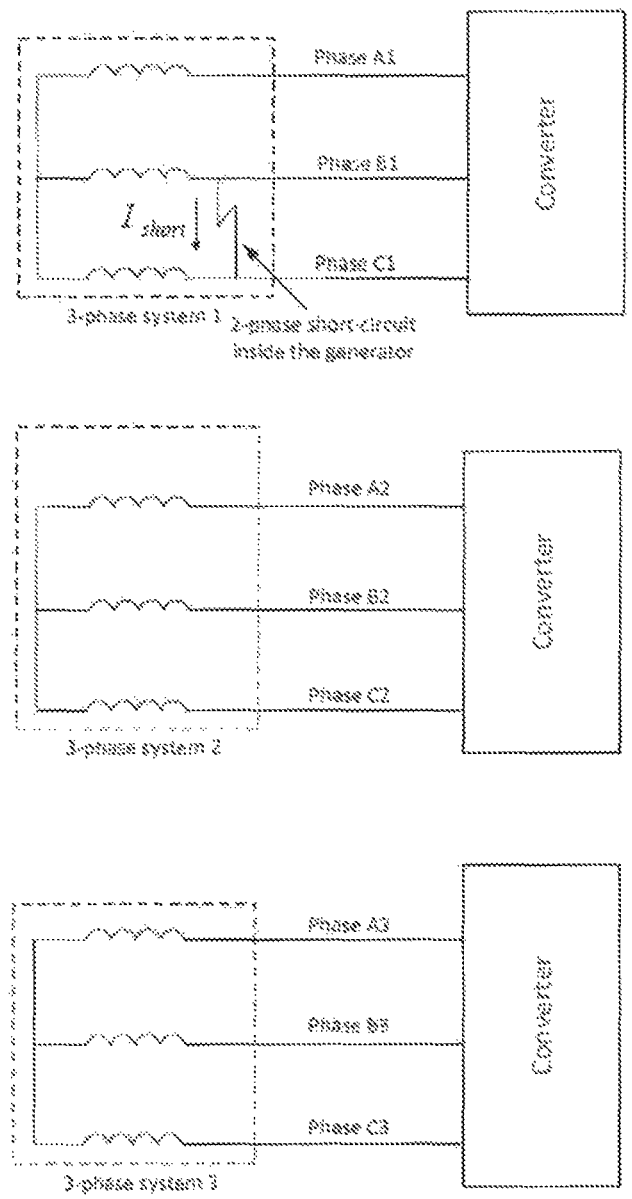
FIG. 1A schematically illustrates an example of a 3 times 3-phase system, namely a 9-phase system in a permanent magnet generator.

FIG. 1A illustrates schematically an example of a 2-phase short circuited 9 phase system, i.e. a system with 3 sets of 3 stator windings, which is a particular example of a permanent magnet generator that may be used in wind turbines, for example large offshore wind turbines. In this example, each converter individually controls three windings A, B, C that are coupled to each other, resulting in 3 independently controlled 3-phase circuits, namely 3-phase systems 1, 2 and 3. As shown in the figure, phases B1 and C1 illustrate an unbalanced short circuit.

Figure 1B:
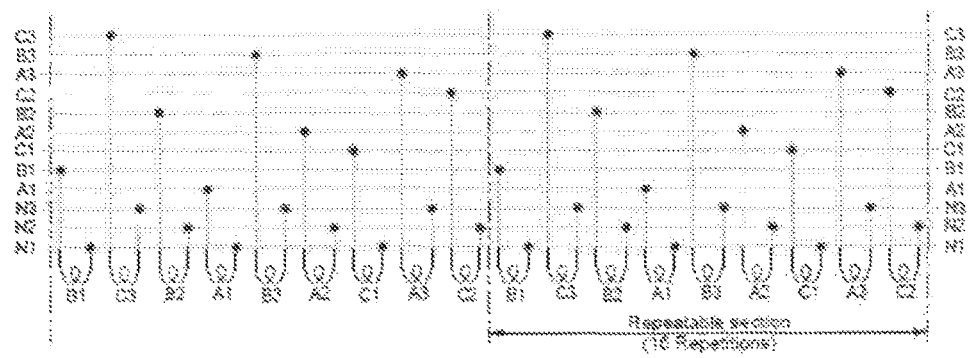
FIG. 1B schematically illustrates an example of the windings disposition around the stator in a 9-phase system of a permanent magnet generator.

FIG. 1B illustrates in more detail the tooth windings disposition around the stator in a 9-phase system according to specific examples of the present disclosure. Such tooth windings A, B, C comprise coils having a first end and a second end and consisting of copper strands. The system may comprise 16 parallel circuits and account for a total of 144 stator slots. Each coil may be connected to the current cable at the first end and to ground at the second end. All ground coil endings of each subsystem may be connected together. Such connections may result in 9 connection rings, namely C3, B3, A3, C2, B2, A2, C1, B1 and A1 in the figure.

As for measuring the current flowing in the circuit, one or more sensors may be arranged in the circuit in order to directly or indirectly measure currents. For instance, in these examples, at least one current sensor may be arranged at the first end of each of the stator windings for communicating the measured current to the converter.

Figure 1C:
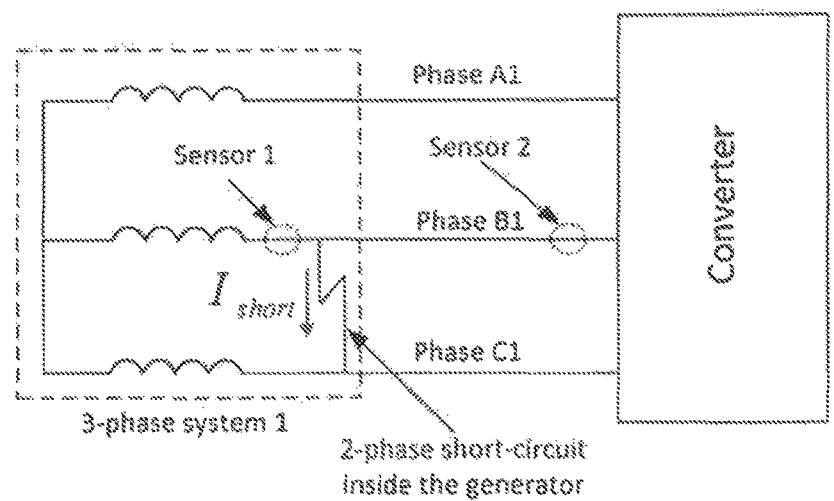
FIG. 1C schematically illustrates an example of sensors disposition in a 3-phase system.

FIG. 1C schematically illustrates sensors disposition in a 3-phase system. According to examples of the present disclosure, sensors may be located in the position corresponding to sensor 1 in the figure, so that they are as close to each stator winding as possible. This allows for an accurate measurement of the short circuit currents occurring in each of the windings. When compared to eventually positioning a sensor in the sensor 2 position as shown in the figure, the latter might detect eventual alterations of currents flowing through them, but not necessarily measure with precision the short circuit asymmetrical currents responsible for the oscillating torque.

Alternatively, currents may be estimated through indirect measurement of other parameters. For instance, currents may be obtained from phase-to-neutral voltage measurements. In such case, one or more voltmeters might be arranged at the first end of each of the stator windings and the neutral point prior to the converter.

If said stator windings are connected in a wye coupling as in the current example, they may be, in a set of three stator windings, coupled in a star point at the first end of each of the stator windings. Alternatively, in other examples, said stator windings may be connected in a delta coupling, i.e., in a set of three stator windings, connected in a ring to each other.

As described above, such systems may be subjected to unbalanced short circuits when a two-phase short circuit occurs in the generator, whose consequences may include fire in the generator and other elements nearby.

Figure 2:
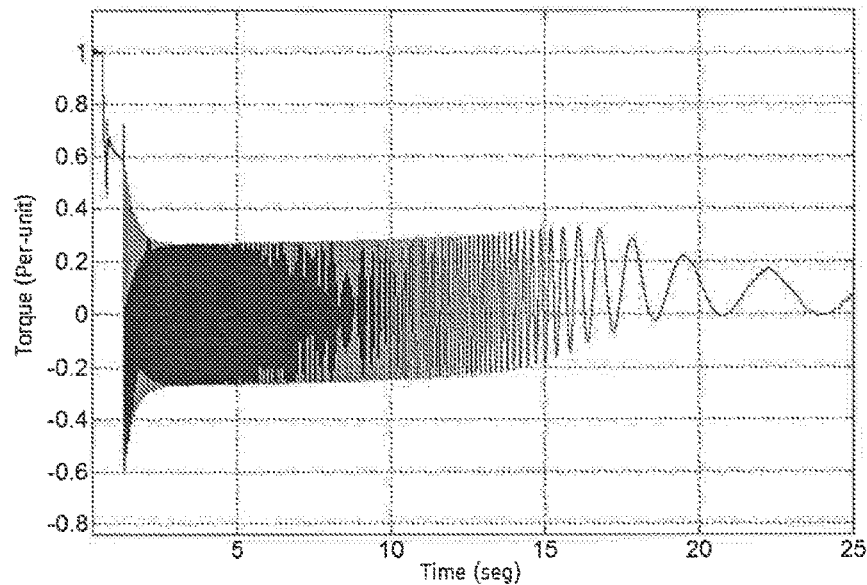
FIG. 2 illustrates an example of an oscillating torque that may result from a two phase short circuit according to examples of the present disclosure.

FIG. 2 illustrates an example of an oscillating torque that may result from a two phase short circuit in a torque vs. time plot, without any negative sequence additional control. It can be observed that the oscillation amplitude decreases with time. However, this torque oscillation might go through a very large frequency range resulting in a high risk of exciting resonances in the drive train and turbine foundation, which may cause serious turbine damage. It is therefore desirable to attain a faster reduction—ideally, complete elimination—of said transient torque.

Figure 3:
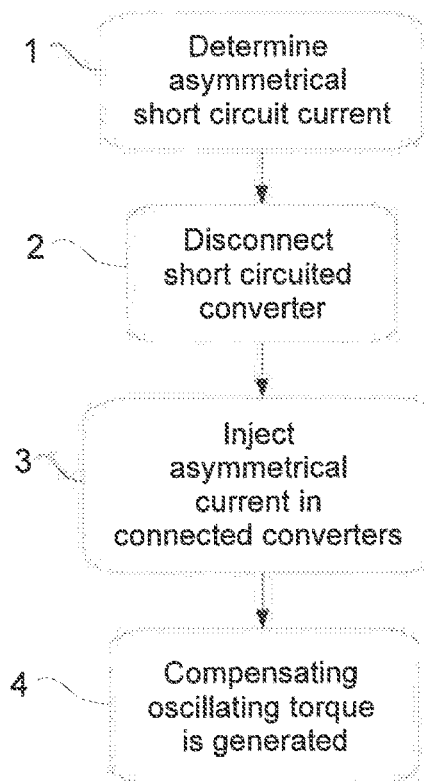
FIG. 3 illustrates a flow diagram of one example of a method for protecting the generator of a permanent magnet wind turbine according to the present disclosure.

FIG. 3 illustrates a flow diagram of one example of a method for protecting the generator of a permanent magnet wind turbine.

At block 1, a control determining an asymmetrical short circuit current may be provided. The short circuit current may be a 2-phase or a phase-to-neutral short circuit. Both of them, as mentioned above, result in an unbalanced short circuit that may cause severe damage due to torque oscillation. In order to determine this short circuit current, the system may be provided with current sensors that allow measuring currents in between the plurality of converters and the sub-stator windings. Each one of these sensors may be arranged at or near an end of each of the stator windings located between the coils and the converter, so that the current may be measured with a high accuracy.

Optionally, sensors may be provided for each of the coils. These locations of the sensors allows measuring the short circuit directly at the winding, whereas sensors located further away might a) not detect the short circuit, or b) detect it without providing any certainty on the short circuit origin.

At block 2, a control disconnecting the converter linked to an asymmetrically short circuited 3-phase winding may be provided. This occurs immediately upon detection of the asymmetrical short circuit, and corresponds to a typical action in presence of any type of a short circuit in a generator.

At block 3, an asymmetrical current may be injected by the remaining connected converters into the not-short circuited 3-phase systems. That is, for example, in a 9-phase system (as illustrated in FIGS. 1A and 1B) with a short circuited system corresponding to phases A1, B1 and C1 the two converters connected to phases A2, B2 and C2, and A3, B3 and C3 respectively might determine and then inject said asymmetrical current to the phases they are connected to, namely phase systems 2 and 3.

In order to determine the short circuit current, the converter may mathematically express the short circuit current in terms of a positive and a negative current sequence. The base for such an expression lies in that an asymmetrical set of N phasors can be expressed as a linear combination of N symmetrical sets of phasors by means of a well-known complex time-domain linear transformation (see block 10 of scheme in FIG. 5).

In an example of a 3-phase system, one set of phasors has the same phase sequence as the system under study (positive sequence; say ABC), the second set has the reverse phase sequence (negative sequence; ACB), and in the third set the phasors A, B and C are in phase with each other (zero sequence). Basically, this method allows converting three unbalanced phases into three independent sources, which makes asymmetric fault analysis more tractable. As a consequence, the resulting symmetrical components are referred to as direct (or positive), inverse (or negative) and zero (or homopolar). In the present disclosure, the negative current sequence may be regarded as the one responsible for the short circuit related oscillating torque or first oscillating torque.

At block 4, the injected asymmetrical current, in particular the negative current sequence of such currents, generates a second oscillating torque, which is substantially opposed in phase to the first oscillating torque. Advantageously, this results in the first oscillating torque being at least partly compensated. As the disturbing vibration origin is mitigated, the detrimental effects of the unbalanced short circuit on the wind turbine may be a great deal neutralised.

Figure 4:
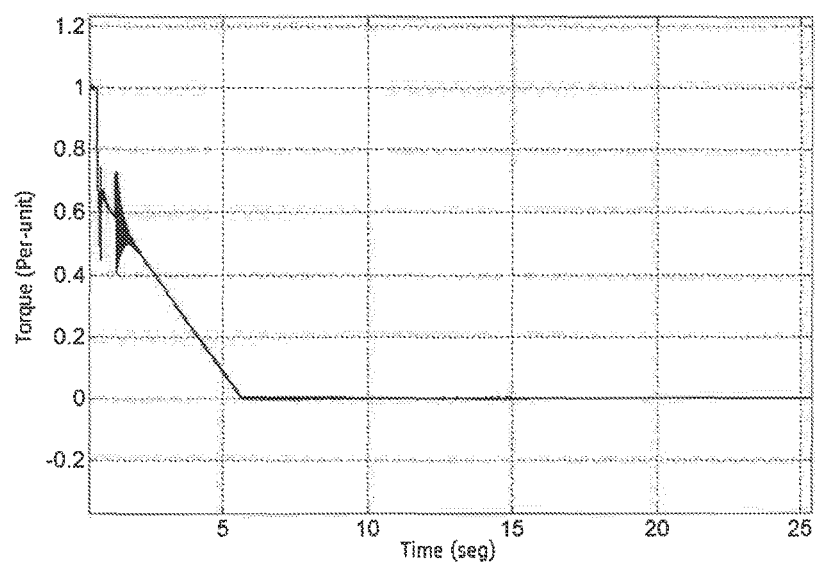
FIG. 4 illustrates an example of an oscillating torque that may result from a two phase short circuit with the negative sequence control used in examples of methods for protecting a permanent magnet generator.

The effect of such torque mitigation is illustrated in FIG. 4, wherein a first oscillating torque is compensated and illustrated in a torque vs. time plot. Advantageously, such mitigation method may be applied even in the absence of a short circuit fault. The mere presence of a negative current sequence in the system may cause an oscillating torque, which is a not desired disturbance during the turbine's operation. A system control based on asymmetrical current injection, as according to the present disclosure, may provide for a balanced system also in the absence of a fault, since it may compel the healthy converters to compensate any asymmetrical current component, thus obtaining a torque free of undesired oscillating components.

Figure 5:
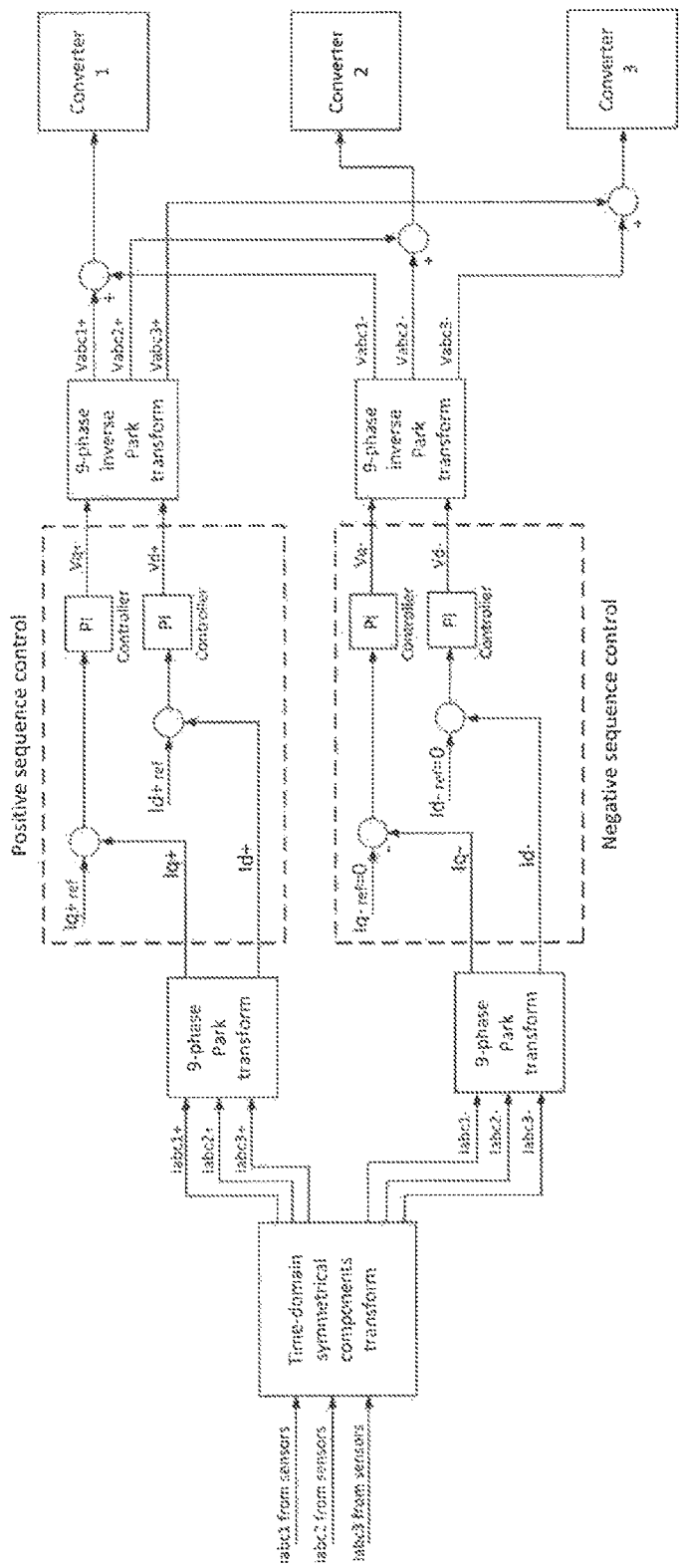
FIG. 5 schematically illustrates an example of a standard positive and an additional negative control configured to balance an oscillating torque caused by a negative sequence current according to the present disclosure.

FIG. 5 schematically depicts an example of a standard positive sequence control system 13, with an additional negative sequence control 14 configured to balance an oscillating torque according to the present disclosure. As shown in the figure, measured asymmetrical currents Iabc1, Iabc2 and Iabc3 can be expressed as symmetrical currents, namely as a positive current sequence Iabc1+, Iabc2+ and Iabc3+, and a negative current sequence Iabc1−, Iabc2− and Iabc3−, by means of a complex time-domain linear transformation illustrated in block 10.

These positive and negative current sequences are inputs to blocks 11 and 12 respectively. Blocks 11 and 12 illustrate a Park transform control or DQ axis control, which is a Direct-axis Quadrature axis control scheme, i.e., a current control using the DQ synchronous reference frame for single-phase converters, that decomposes incoming currents providing Id and Iq components. The DQ axis control method consists in transforming from stationary stator coordinates to rotating field coordinates. As a result, stator currents are defined in a rotating d,q coordinate system such that the "d" axis components is aligned with the rotor magnetic field and the "q" axis component is perpendicular to said magnetic field. The steady state current components in DQ frame become DC instead of AC values so a zero error current control can be implemented.

In this case, Iq+ and Id+ are outputs to the Park transform block 11 and inputs to block 13, namely the positive sequence control box. Analogously, Iq− and Id− are outputs to the Park transform block 12, and inputs to block 14, namely the negative sequence control box. In both cases, components Iq and Id then go through a PID controller (i.e., a proportional-integral-derivative controller) together with the $Iq_{ref}$ and $Id_{ref}$ reference signals respectively. These signals are inputs to the system providing from an upper general control block at the converter (not shown).

Iq+ref is the reference signal for the Q axis current (Quadrature) of the positive sequence control. In general, such current is determined by the torque to be provided by the generator. This reference value may be received from a higher level control. The reference value may depend particularly on the prevalent wind speed.

Id+ref is the reference signal for the D axis current (Direct axis) of the positive sequence control. Also this reference value may be supplied from a higher level control logic. In particular the Id+ ref is representative of the reactive power to be supplied by the generator.

Analogously, Iq−ref is the reference signal for the Q axis current (Quadrature) of the negative sequence control, and Id−ref is the reference signal for the D axis current (Direct axis) of the negative sequence control. Input reference signals for the negative sequence control are set equal zero, since negative sequence currents are not desired in general.

Blocks 13a and 13b illustrate PID controllers for the Iq+ and Id+ components respectively in the positive sequence control 13, and blocks 14a and 14b illustrate PID controllers for the Iq− and Id− components respectively in the negative sequence control 14. A RD controller (proportional-integral-derivative controller) calculates an error value as the difference between a measured process variable and a desired setpoint, attempting to minimize the error by adjusting the process through use of a manipulated variable.

Outputs of controllers 13a and 13b are voltage components Vq+ and Vd+ respectively, and outputs of blocks 14a and 14b are voltage components Vq− and Vd− respectively. As these outputs are introduced in blocks 15 (positive sequence) and 16 (negative sequence), all of them are transformed by an inverse Park transform yielding three positive and three negative voltage components. It can be seen that each component Vabc1+, Vabc2+ and Vabc3+ (nine voltages) of the positive control output is added to each component Vabc1−, Vabc2− and Vabc3− (nine voltages) of the negative control output for each one of the converters 1, 2 and 3, yielding a single control output signal for each of the three-phase systems.

Under "normal" circumstances, there will not be any negative currents (or almost none). The error value in the PID control of the bottom part will thus be zero (or very close to zero). In this sense, in normal circumstances, the negative sequence control is not active and may be regarded as being "turned off".

As soon as negative currents appear, regardless of the reason, the bottom part of the control will become active immediately. The output of the bottom part is added to the normal control of the top part of the logic.

Permanent magnet generators are usually provided with a positive sequence control, managed by the turbine's converter, which operates during standard conditions. As previously mentioned, such scheme usually foresees the disconnection of the short-circuited system whenever a fault is detected. However, no further action may be taken in such case. The negative sequence control is configured to inject a negative sequence torque according to the present disclosure. It is by means of the addition of this control scheme that the presented solution may be implemented in the converter.

Thus, an advantage of the presented examples is that no additional elements are to be installed in the turbine in order to implement the proposed solution, such as e.g., relays mentioned above. In any conventional wind turbine, the converter is in charge of the generator control. Thus, reprogramming of said converter, that is, the addition of the DQ negative control scheme to the DQ positive control scheme, may be sufficient in order to implement the negative sequence control features herein disclosed. Such features' addition accounts for a cost-effective solution to the presented technical problem, both from an implementation as well as from an eventual maintenance point of view. As mentioned above, it may thus be operating in absence of a fault, thus increasing the quality and the efficiency of the resulting loading.

A further advantage of the present disclosure is the reliability of the asymmetrical short circuit related control system. On the one hand, the presence of a short circuit may be accurately detected by the current sensors, which are located as close to the windings as possible. On the other hand, the system response of injecting a negative sequence current by the converter may occur much faster than other countermeasures might, e.g., countermeasures that might require mechanical actions. Therefore, the proposed solution is considerably fast and effective, since it quickly reduces the undesired risk of turbine resonance to a great extent.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for protecting a permanent magnet generator with a multiphase generator, and n-number of electrically isolated converters, wherein the multiphase generator has a rotor carrying permanent magnets and n-number of independent multiphase sub-stators each having a plurality of windings, and each converter is connected to an independent multiphase sub-stator and configured to control the plurality of windings of the multiphase sub-stator, the method comprising:
 determining an asymmetrical short circuit current in one of the sub-stators that results in generation of a first oscillating torque;
 disconnecting the converter linked to the sub-stator with an asymmetrically short circuited group of windings; and
 injecting an asymmetrical current with the remaining connected converters, wherein the injected asymmetrical current generates a second oscillating torque that is opposed in phase to the first oscillating torque to an extent that the first oscillating torque is at least partly compensated.

2. The method according to claim 1, wherein the asymmetrical short circuit comprises a two-phase short circuit.

3. The method according to claim 1, wherein the asymmetrical short circuit comprises a phase-to-neutral short circuit.

4. The method according to claim 1, wherein determining the asymmetrical short circuit current comprises measuring currents in between a plurality of converters and windings.

5. The method according to claim 1, wherein the permanent magnet generator comprises a plurality of stator windings constituting a plurality of 3-phase systems, each 3-phase system connected to an electrically isolated one of the converters.

6. The method according to claim 1, wherein determining the short circuit current further comprises mathematically expressing the short circuit current in terms of a positive and a negative current sequence, the positive current sequence being the direct component of N symmetrical sets of phasors that express N asymmetrical sets of phasors as a linear combination, and the negative current sequence being the inverse component of N symmetrical sets of phasors that express N asymmetrical sets of phasors as a linear combination.

7. The method according to claim 6, wherein the converters are configured to control the positive current sequence in the windings according to a standard operational control.

8. The method according to claim 7, wherein injecting a symmetrical current by the remaining connected converters comprises generating a current wherein the negative sequence current of the asymmetrical current generates the second oscillating torque.

9. A permanent magnet multiphase generator, comprising:
  at least two electrically isolated converters;
  a rotor carrying permanent magnets and n-number of independent multiphase sub-stators, each sub-stator comprising a plurality of windings;
  each converter connected to an independent multiphase sub-stator and configured to control the plurality of windings of the multiphase sub-stator;
  a plurality of sensors disposed to measure parameters indicative of currents in one or more of the stator windings; and
  a control configured to balance a first oscillating torque generated by an asymmetrical short circuit current in accordance with the method of claim 1.

10. The generator according to claim 9, wherein the sensors are current sensors.

11. The generator according to claim 10, wherein each of the sensors is arranged at or near an end of each of the stator windings located between the stator winding and the converter.

12. The generator according to claim 9, wherein the independent multiphase sub-stators comprise a plurality of stator windings constituting a plurality of 3-phase systems, each 3-phase system connected to an electrically isolated one of the converters.

13. The generator according to claim 12, wherein the generator comprises three converters, each converter connected with a set of 3-phase stator windings, the sets of stator winding 40° electrically phase shifted in relation to each other.

14. A wind turbine, comprising a permanent magnet generator according to claim 9.

* * * * *